United States Patent
France et al.

(10) Patent No.: US 10,330,393 B2
(45) Date of Patent: Jun. 25, 2019

(54) MODULAR LATENT HEAT THERMAL ENERGY STORAGE SYSTEMS

(71) Applicant: UCHICAGO ARGONNE, LLC, Argonne, IL (US)

(72) Inventors: David M. France, Lombard, IL (US); Wenhua Yu, Darien, IL (US); Dileep Singh, Naperville, IL (US); Taeil Kim, Downers Grove, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 1110 days.

(21) Appl. No.: 14/190,664

(22) Filed: Feb. 26, 2014

(65) Prior Publication Data
US 2015/0241137 A1 Aug. 27, 2015

(51) Int. Cl.
*F28D 20/02* (2006.01)
*F28F 13/00* (2006.01)
(Continued)

(52) U.S. Cl.
CPC ........... *F28D 20/021* (2013.01); *F03G 6/067* (2013.01); *F28D 20/023* (2013.01);
(Continued)

(58) Field of Classification Search
CPC ....... F28D 2020/0013; F28D 2020/006; F28D 2020/0065; F28D 2020/0082; F28D 20/026
See application file for complete search history.

(56) References Cited

U.S. PATENT DOCUMENTS 3,878,888 A * 4/1975 Seidl ................... F28D 1/0535
165/128
4,524,756 A 6/1985 Laverman
(Continued)

FOREIGN PATENT DOCUMENTS

CN 102954724 A * 3/2013
DE 102011052868 A1 * 2/2013 ............. F28D 20/02

OTHER PUBLICATIONS

K. Nithyanandam, et al., Computational studies on a latent thermal energy storage system with integral heat pipes for concentrating solar power, Applied Energy, 103 (2013), pp. 400-415.
(Continued)

*Primary Examiner* — Frantz F Jules
*Assistant Examiner* — Lionel Nouketcha
(74) *Attorney, Agent, or Firm* — Cherskov Flaynik & Gurda, LLC

(57) ABSTRACT

The invention provides a modular device for latent heat storage, which is made of a conduit with a first end and a second end; and a jacket that surrounds a portion of the conduit between the first end and the second end, wherein the jacket is comprised of at least one phase change material. The invention further provides a system for latent heat storage, comprising a thermally insulated enclosure adapted to receive at least one modular latent heat storage device and a HTF, wherein the HTF flows from an upstream heat source into each of the first ends of the conduit and out of each of the second ends of the conduit comprising the at least one module to a downstream heat exchanger.

7 Claims, 12 Drawing Sheets

(51) Int. Cl.
*F03G 6/06* (2006.01)
*F28D 20/00* (2006.01)
(52) U.S. Cl.
CPC ............ *F28D 20/026* (2013.01); *F28F 13/00* (2013.01); *F28D 2020/0013* (2013.01); *F28F 2270/00* (2013.01); *Y02E 10/46* (2013.01); *Y02E 60/145* (2013.01)

(56) References Cited

U.S. PATENT DOCUMENTS

| | | | |
|---|---|---|---|
| 6,000,438 | A | 12/1999 | Ohrn |
| 6,116,290 | A | 9/2000 | Ohm et al. |
| 6,889,751 | B1* | 5/2005 | Lukas ................ B60H 1/00492 165/10 |
| 6,978,825 | B1 | 12/2005 | Baylot et al. |
| 7,316,262 | B1* | 1/2008 | Rini ...................... F28D 20/023 165/10 |
| 7,896,033 | B2 | 3/2011 | Hallot et al. |
| 8,273,474 | B2 | 9/2012 | Al-Hillaj et al. |
| 2009/0109623 | A1* | 4/2009 | Jang ................... F28D 15/0233 361/700 |
| 2009/0211249 | A1* | 8/2009 | Wohrer ..................... F01K 3/00 60/641.8 |
| 2010/0175689 | A1* | 7/2010 | Zillmer ..................... F16L 9/18 126/90 R |
| 2011/0083436 | A1* | 4/2011 | White ....................... F01K 3/08 60/670 |
| 2011/0286724 | A1* | 11/2011 | Goodman ............ F24H 7/0466 392/346 |
| 2014/0014299 | A1* | 1/2014 | Ebata ................... F28D 20/003 165/104.12 |

OTHER PUBLICATIONS

K. Nithyanandam, et.al., Analysis and optimization of a latent thermal energy storage system with embedded heat pipes, International Journal of Heat and Mass Transfer 54 (2011) pp. 4596-4610.

Hamidreza Shabgard, et al., Heat transfer and exergy analysis of cascaded latent heat storage with gravity-assisted heat pipes for concentrating solar power applications, ScVerse ScienceDirect, Solar Energy 86 (2012), pp. 816-830.
Zhen Yang, et al., Melting of Phase Change Materials with Volume Change in Metal Foams, Journal of Heat Transfer, (Jun. 2010), vol. 132, pp. 062301-1 to 062301-11.
C.Y. Zhao, et al., Heat transfer enhancement for thermal energy storage using metal foams embedded within phase change materials (PCMs), ScienceDirect, Solar Energy 84 (2010), pp. 1402-1412.
D. Zhou, et al., Experimental investigations on heat transfer in phase change materials (PCMs) embedded in porous materials, Applied Thermal Engineering 31 (2011), pp. 970-977.
Y. Tian, et al., A numerical investigation of het transfer in phase change materials (PCMs) embedded in porous metals, Energy 36 (2011 pp. 5539-5546.
C.Y. Zhao, et al., Heat transfer enhancement of high temperature thermal energy storage using metal foams and expanded graphite, Solar Energy Materials & Solar Cells, 95 (2011), pp. 636-643.
K.W. Ng, et al., Heat Transfer in Free Convection-Dominated Melting of a Phase Change Material in a Horizontal Annulus, Int. Comm. Heat Mass Transfer, vol. 25, No. 5, (1998), pp. 631-641.
A.A. El-Sabali, et al., One thousand thermal cycles of magnesium chloride hexahydrate as a promising PCM for indoor solar cooking, Energy Conversion and Management 52 (2011), pp. 1771-1777.
Piia Lamberg, et al., Numerical and experimental investigation of melting and freezing processes in phase change material storage, International Journal of Thermal Sciences 43 (2004), pp. 277-287.
Charles W. Forsberg, et al., High-Temperature Liquid-Fluoride-Salt Closed-Brayton-Cycle Solar Power Towers, Journal of Solar Energy Engineering, May 2007, vol. 129, pp. 141-146.
Robynne Murray, et al., Design of a Latent Heat Energy Storage System Coupled with a Domestic Hot Water Solar Thermal System, World Renewable Energy Congress 2011-Sweden, Linkoping Sweden, May 8-13, 2011, pp. 3757-3764.
Weihuan Zhao, et al., High Temperature Calorimetry and Use of magnesium Chloride for Thermal Energy Storage, Renewable Energy 50 (2013) 988-993.

* cited by examiner

MODULAR LATENT HEAT THERMAL ENERGY STORAGE SYSTEMS

BACKGROUND OF THE INVENTION

1. Field of the Invention

This invention is directed to a system for energy storage, and more particularly this invention relates to a system for storing thermal energy generated by concentrated solar power (CSP).

2. Background of the Invention

Solar power from the sun provides an almost limitless source of free fuel. Power produced through solar energy is renewable and clean, i.e., does not require the burning of fossil fuels.

Although photovoltaic panels have received a vast amount of attention, one emerging form of harnessing the sun's power is the CSP plant. CSP plants utilize fields of mirrors, called heliostats, to reflect the sun's rays to a focal point, called a receiver. Most heliostats are able to rotate or tilt to follow the sun throughout the day to maximize the amount of sunlight reflected. Further, a multitude of receivers have been developed to effectively distribute the energy to downstream components. For instance, some CSPs have fields of heliostats that all reflect to a single solar tower receiver; some have parabolic troughs that reflect the energy onto a fluid pipeline; some have fields of parabolic dishes in which each dish features its own receiver; and some utilize rows of linear Fresnel reflectors to reflect the energy to stationary absorbers.

Regardless of the type, the receiver contains a heat transfer fluid (HTF) to absorb the energy in the form of heat. For CSP plants that use water as the HTF, the water is boiled to saturated steam and then circulated to a downstream dry steam generator. The steam is used to rotate a conventional steam turbine, which generates electricity. The PS10 Solar Power Plant near Seville, Spain, operates in this fashion. This mode of operation, however, only works while the sun is shining, and consequently, energy cannot be produced at night or on an overcast day (hereinafter referred to as "nonoptimal times").

To overcome this limitation, some CSP plants utilize HTFs other than water to store the heat. As its name suggests, an HTF is a fluid used to absorb thermal energy and then transfer that energy to another medium. Such CSP plants store thermal energy by raising the temperature or changing the phase of the HTF. Storing thermal energy in a medium by raising the medium's temperature is called sensible heat storage. Sensible heat storage is the opposite of latent heat storage in which thermal energy is stored in a medium without an accompanying change in the medium's temperature. In most practical applications, especially with a large volume of a medium, some sensible heating will occur during latent heating in portions of the medium that have already undergone the phase transformation.

Conventional CSP plants operate via two types of sensible heat storage: direct and indirect. An example of a direct sensible heat storage CSP plant is Torresol Energy's Gemasolar Plant in Seville, Spain. Direct sensible heat storage utilizes a cold HTF storage tank and a hot HTF storage tank. The HTF from the cold storage tank is circulated through the receiver where it is heated. The warmed HTF then flows to the hot storage tank. During normal daily operation, a portion of the warmed HTF is circulated through a heat exchanger where it boils water in a secondary loop into steam to turn downstream turbines. The remaining portion of the warmed HTF produced during the day is stored in the hot storage tank, which creates a reserve for operation during nonoptimal times. After the heat exchanger, the HTF is then recirculated to the cold storage tank where it remains until it can be reheated the next day. A schematic diagram of a direct sensible heat storage CSP plant can be seen in prior art FIG. 1A.

The indirect sensible heat storage CSP plants use two HTFs. The first HTF absorbs heat from the receiver and is selected for a number of reasons including: high operation temperature, low pumping power, and high heat transfer efficiency. The second HTF stores the heat for use during nonoptimal times and is selected primarily for its high specific heat capacity. In this way, the heat transfer and heat storage fluids can be optimized for their respective functions. During daily operation, the first fluid, which circulates through the receiver, interacts with two parallel fluid conduits or loops. In the first parallel loop, the first fluid circulates through a heat exchanger to boil water, and that boiling water/steam turns a downstream turbine. In the second parallel loop, the second fluid flows from a cold storage tank through a heat exchanger to absorb heat from the first fluid and is then stored in a hot storage tank. During nonoptimal times, the second fluid reverses path and the first fluid reabsorbs the heat from the second fluid. The first fluid is then circulated in the first parallel loop, boiling water via the water heat exchanger. A schematic representation of an indirect sensible heat storage CSP plant can be found in prior art FIG. 1B.

As can be seen in prior art FIGS. 1A and 1B, both conventional sensible heat storage forms require the use of at least two storage tanks. These storage tanks are large and expensive to fabricate. For example, each cylindrical tank in an exemplary CSP plant has a diameter of 36 m (118 ft) and a height of 14 m (46 ft). Besides being large, the tanks are also difficult to maintain, requiring costly shutdown times to address even small problems. Further, as can be seen in FIG. 1B, an indirect sensible heat storage system requires a complex array of heat exchangers to operate.

Besides sensible heat storage CSP plants, latent heat storage has also been researched. Latent heat storage has a higher volumetric energy density than sensible heat storage. This is because the amount of energy stored in a sensible heat storage system is proportional to the mass of the storage media, while latent heat storage sequesters more energy in the same given mass. Latent heat storage also has higher power cycle efficiency than sensible heat storage because the changes in temperature are smaller. Smaller temperature changes prevent losses of usable energy in the form of increased entropy. Further, Carnot efficiency is higher at smaller temperature changes.

Latent heat storage systems are relatively nascent in their development, and there is no standard design; however, they all attempt to store thermal energy in phase change materials (PCMs). PCMs store or release a large amount of energy as the result of a phase transformation. In most cases, energy is stored through liquefying a solid and released through solidifying a liquid. During the melting and freezing processes, the temperature of the PCM does not change as all available energy is used or released to overcome the PCM's latent heat of fusion.

Latent heat storage is a promising technology because greater efficiencies can be achieved in isothermal or near-isothermal systems. One measure of a system's efficiency is its exergy efficiency. Exergy refers to the amount of useful energy that can be extracted from a system given that some energy will be lost to the surroundings as a result of entropy. Entropy increases with a positive change in temperature. Therefore, a highly efficient thermal storage system will transfer most of its energy without undergoing a large change in temperature.

In a well-insulated latent heat thermal energy storage (LHTES) system, the exergy efficiency of the system is given by the following equation:

$$\psi_{overall} = \frac{Ex_{HTF\ discharge}}{Ex_{HTF\ charge}} \quad (1)$$

where $\psi_{overall}$ is the exergy efficiency of the system, $Ex_{HTF\ charge}$ is the total exergy supplied by the HTF during charging and $Ex_{HTF\ discharge}$ is the exergy recovered by the HTF during discharging. Since the system is well insulated, the exergy loss in the PCM during charging and discharging is negligible.

As of yet, however, only small scale latent heat storage systems have been developed, and there is no system close to the scale necessary to store energy for a CSP plant. Therefore, a need exists for a large scale, highly exergy efficient LHTES system that has a comparatively smaller size and lower construction and operational costs than conventional sensible heat storage systems.

SUMMARY OF THE INVENTION

An object of the present invention is to provide an energy storage device that overcomes many of the disadvantages of the prior art.

Another object of the present invention is to provide an LHTES device. A feature of the present invention is that the system is comprised of storage modules in which a PCM is supported on a porous substrate to latently store thermal energy generated from concentrations of solar power. An advantage of the present invention is that a higher percentage of captured solar energy is ultimately utilized for electrical power generation, whether or not the sun is shining.

A further object of the present invention is to provide a modular energy storage system. A feature of the present invention is that the storage system is composed of a multitude of removable storage modules. An advantage of the present system is that individual modules can be replaced as necessary without disrupting the operation of the CSP plant.

Yet another object of the present invention is to provide a storage system that can easily accommodate cascaded latent heat storage media. A feature of the present invention is the use of a plurality of PCMs in one or a plurality of energy storage modules, each PCM having different melting temperatures. An advantage of the present invention is that the modules can be tailored such that the melting temperature of each PCM corresponds to the temperature of the HTF at that point in the storage module.

Still another object of the present invention is to provide a smaller and less expensive thermal energy storage system for power generating plants. A feature of the present invention is a single containerless storage design that encapsulates or otherwise comprises a plurality of modules. A further feature of the present invention is the ability to adjust the number of individual modules and the flow rate of the HTF through each of the modules. Advantages of the present invention include the reduction of capital installation costs by the single containerless storage design and the minimization of operational costs by tailoring the modules (e.g., length, inner diameter, out diameter, and therefore the volume) to power storage requirements.

Still another object of the present invention is to provide a thermal energy storage system that can store and deliver energy at greater than 95% exergy efficiency. A feature of the present invention is that latent heat storage provides greater power cycle efficiency because of the smaller changes in temperature during storage. An advantage of the present invention is that a storage system with high exergy efficiency can be constructed and built at lower cost.

The invention provides a modular device for latent heat storage comprised of a conduit with a first end and a second end and a jacket that surrounds a portion of the conduit between the first end and the second end, wherein the jacket is comprised of at least one PCM.

The invention also provides a system for latent heat storage where the system is made up of a thermally insulated enclosure adapted to receive at least one modular latent heat storage device, which is comprised of a pipe with a first end and a second end and a jacket that surrounds a portion of the pipe between the first end and the second end with the jacket being comprised of a PCM and a thermal diffusion substrate; and a HTF, which flows from an upstream heat source into each of the first ends of the pipe and out of each of the second ends of the pipe comprising at least one module to a downstream heat exchanger.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention is directed to a modular LHTES system that has a particular applicability to CSP plants. Although the LHTES system will be described in the context of a CSP plant, the presently invented system can be used to store energy in a variety of contexts.

General CSP Plant Operation

Figure 1A:
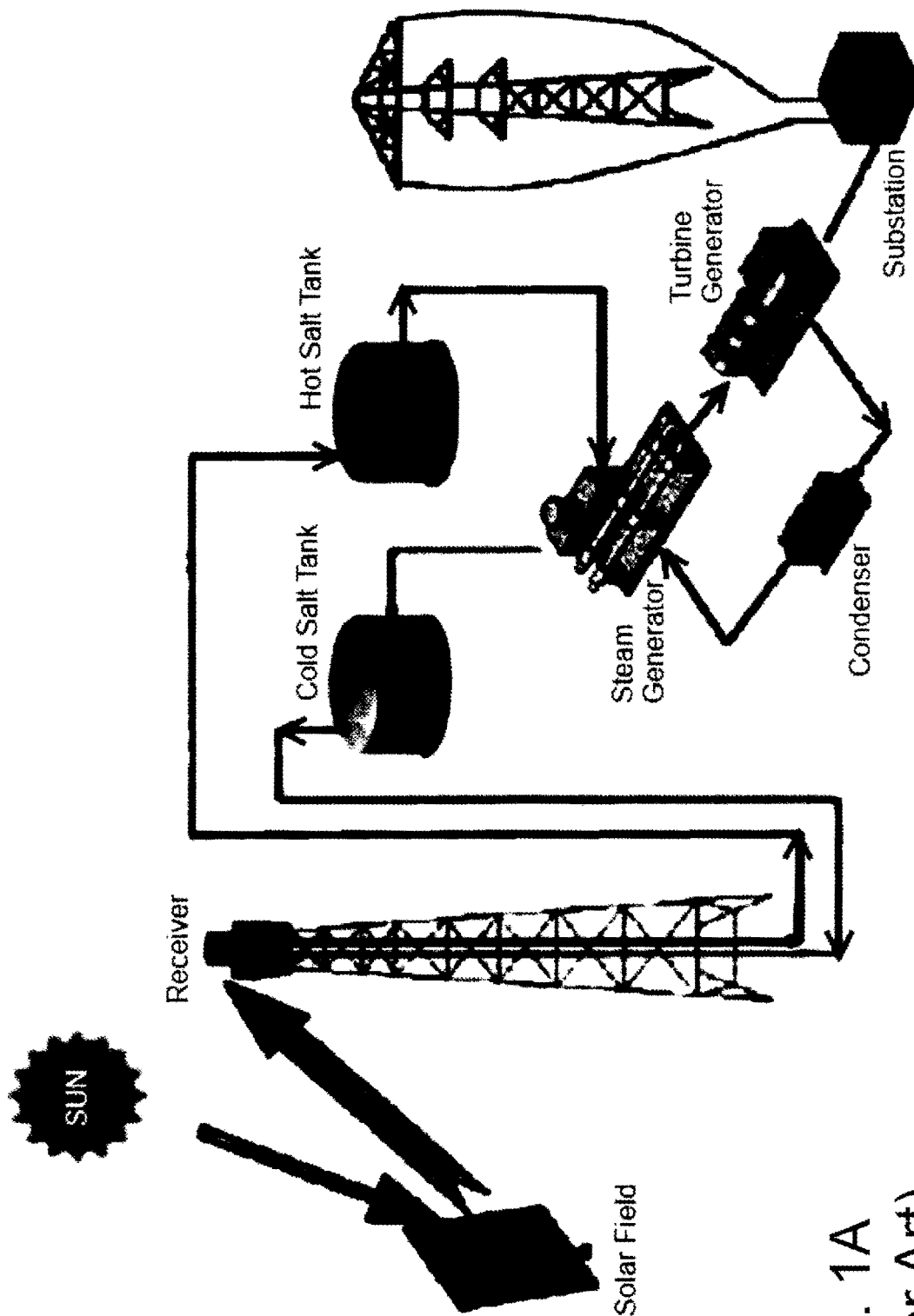
FIG. 1A is a prior art depiction of a direct sensible heat thermal energy storage CSP plant.
Figure 1B:
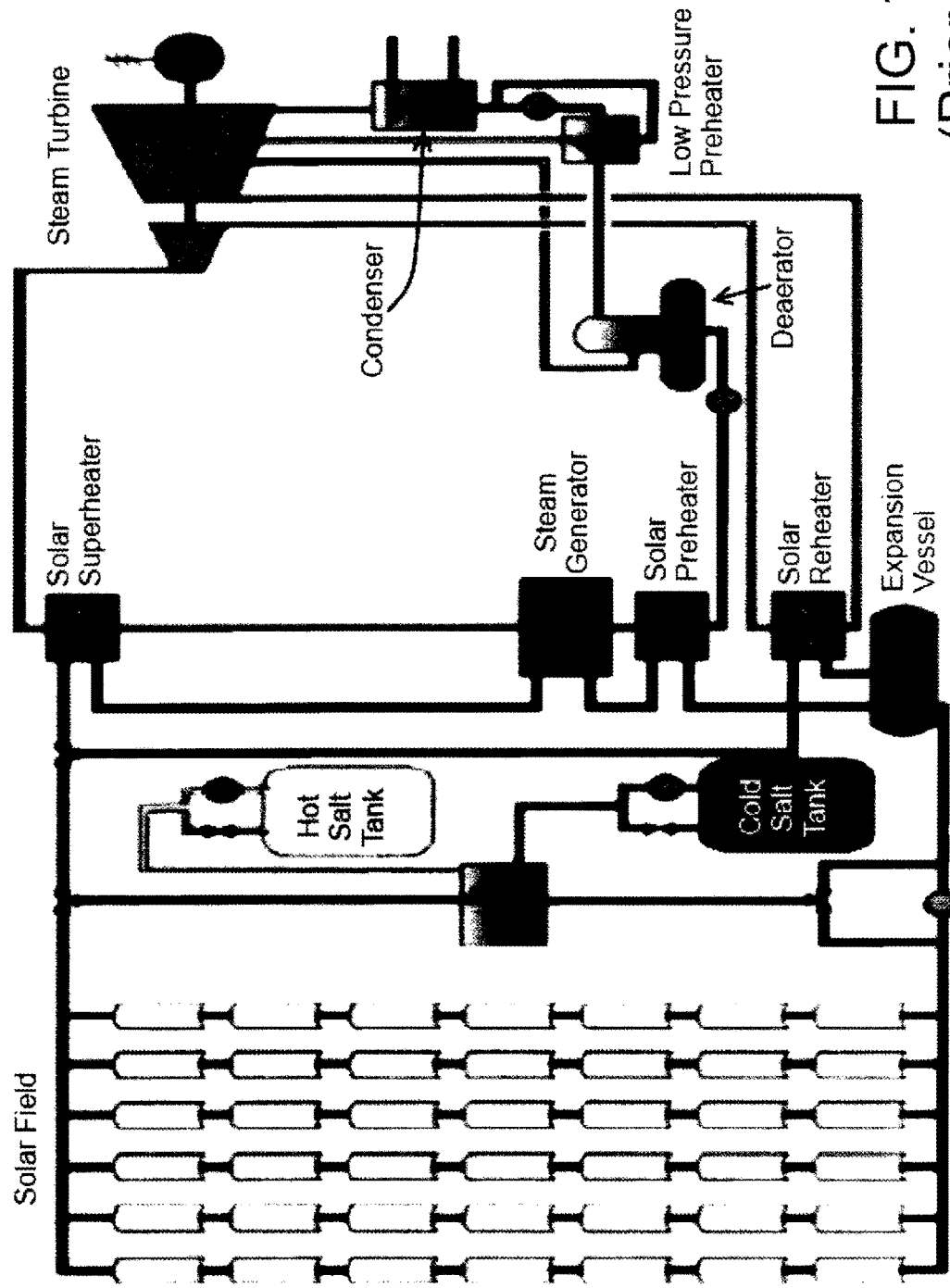
FIG. 1B is a prior art depiction of an indirect sensible heat thermal energy storage CSP plant.
Figure 2:
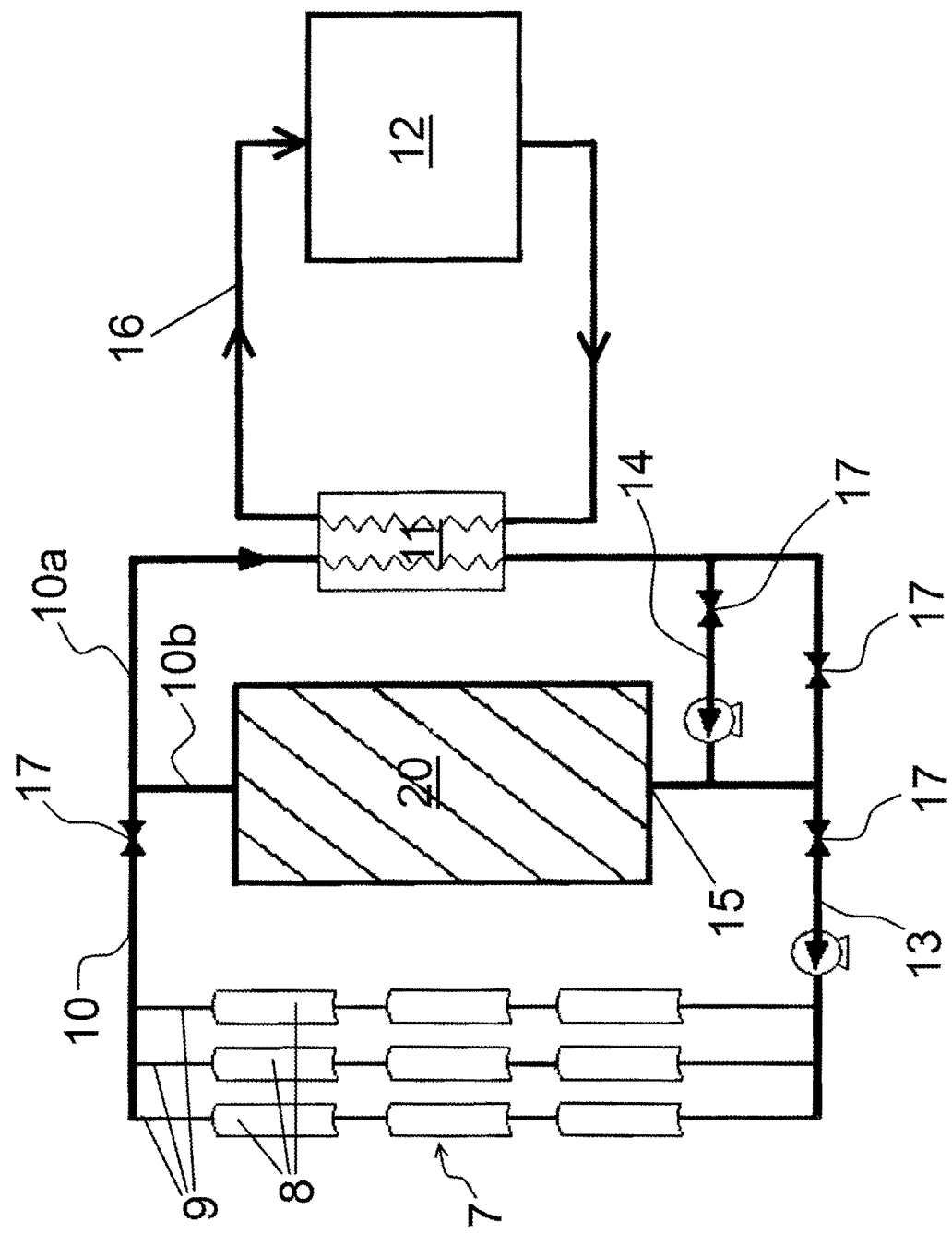
FIG. 2 is a schematic representation of an LHTES CSP plant in accordance with the features of the present invention.

As depicted in FIG. 2, the LHTES system 20 operates downstream from solar energy collectors 7. In an embodiment of the invention, the solar energy collectors 7 as shown in FIG. 2 are parabolic troughs 8 that heat the HTF contained in pipelines 9. The pipelines 9 are in thermal communication with the troughs 8, so as to transport the HTF from the solar collector 8 and into a single inlet line 10. The inlet line 10 directs the HTF to downstream power generation and thermal energy storage components.

A first portion 10a of the inlet line 10 transports the fluid directly to a steam-producing heat exchanger 11 so as to cause the fluid to be in thermal communication with the exchanger 11. The steam generated at the heat exchanger 11 is transported to other downstream power generation components 12, which are likely to include a steam superheater, turbine generator, and condenser.

A second portion 10b of the inlet line 10 directs HTF to the invented LHTES system 20.

During normal daily operation, after releasing or otherwise transferring its energy either through the heat exchanger/steam generator 11 or the LHTES system 20, the HTF is transported back to the energy collectors via a feedback loop. Specifically, an outlet line 13 redistributes the HTF into the pipelines 9, where the HTF is reheated by the parabolic troughs 8. This circulation continues during the CSP plant's daylight hours of operation. This portion of the cycle, whereby thermal energy is stored in the LHTES system 20, is referred to as the "charging cycle."

During nonoptimal times, the HTF can no longer absorb energy from the sun. Instead, the HTF absorbs thermal energy stored in the LHTES system 20. This occurs when the HTF emanating from the exchanger/steam generator 11 is diverted to a latent heating system feed line 14 positioned intermediate the exchanger and the feedback loop. The feed line 14 recirculates spent HTF through a means of ingress 15 of the LHTES system 20. Thus, the HTF absorbs energy from the LHTES system 20. The reheated HTF is then redirected to the heat exchanger/steam generator 11. A secondary or downstream loop 16 of the heat exchanger, positioned intermediate the heat exchanger 11 and the power generation components, establishes thermal communication between the heat exchanger/steam generator 11 and the power generation components 12. The power generation components are the final destination of the energy generated by the system 20. This portion of the CSP plant's operation cycle is known as the "discharging cycle" because the thermal energy stored during the day is discharged during a nonoptimal time.

Although FIG. 2 demonstrates use of the present invention with a parabolic trough CSP plant, other solar energy receivers are equally applicable. Further, other forms of power sources are applicable.

For instance, conventional coal, gas, and nuclear power plants heat water into steam. The steam is then dried so that it can drive downstream turbines. These plants are able to operate through the day and night as long as a sufficient supply of fuel is maintained. However, most power plants instead struggle to supply the proper amount of energy for a given time. Often these plants have trouble meeting peak energy requirements, requiring utility providers to purchase energy from other producers. At the same time, these plants overproduce during nonpeak times, which can lead to dissipating energy by simply grounding the electricity produced if no buyer can be found to take the extra capacity. By incorporating an LHTES system into these power systems, any wasted power that is produced during nonpeak times could be stored for peak times. In this way, an LHTES system could be used to even out energy production in a power plant so that less energy is wasted during production.

LHTES System Operation

Figure 3A:
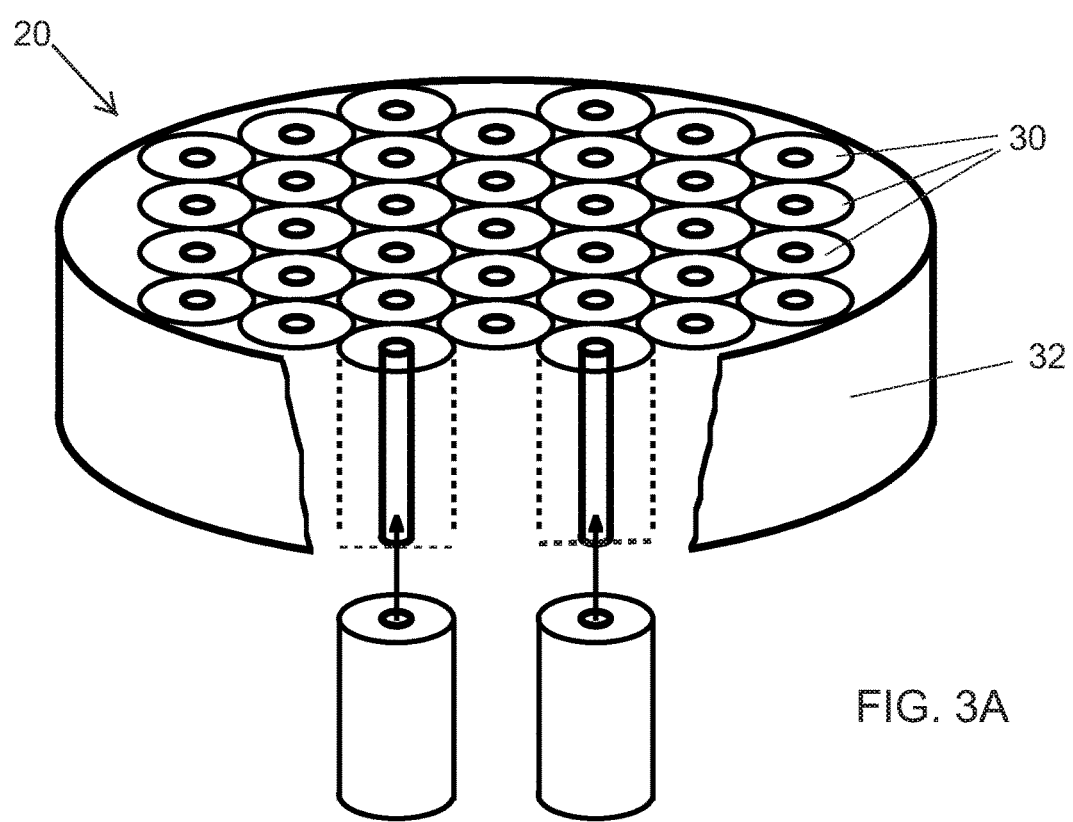
FIG. 3A is perspective view of an LHTES system in accordance with the features of the present invention.
Figure 3B:
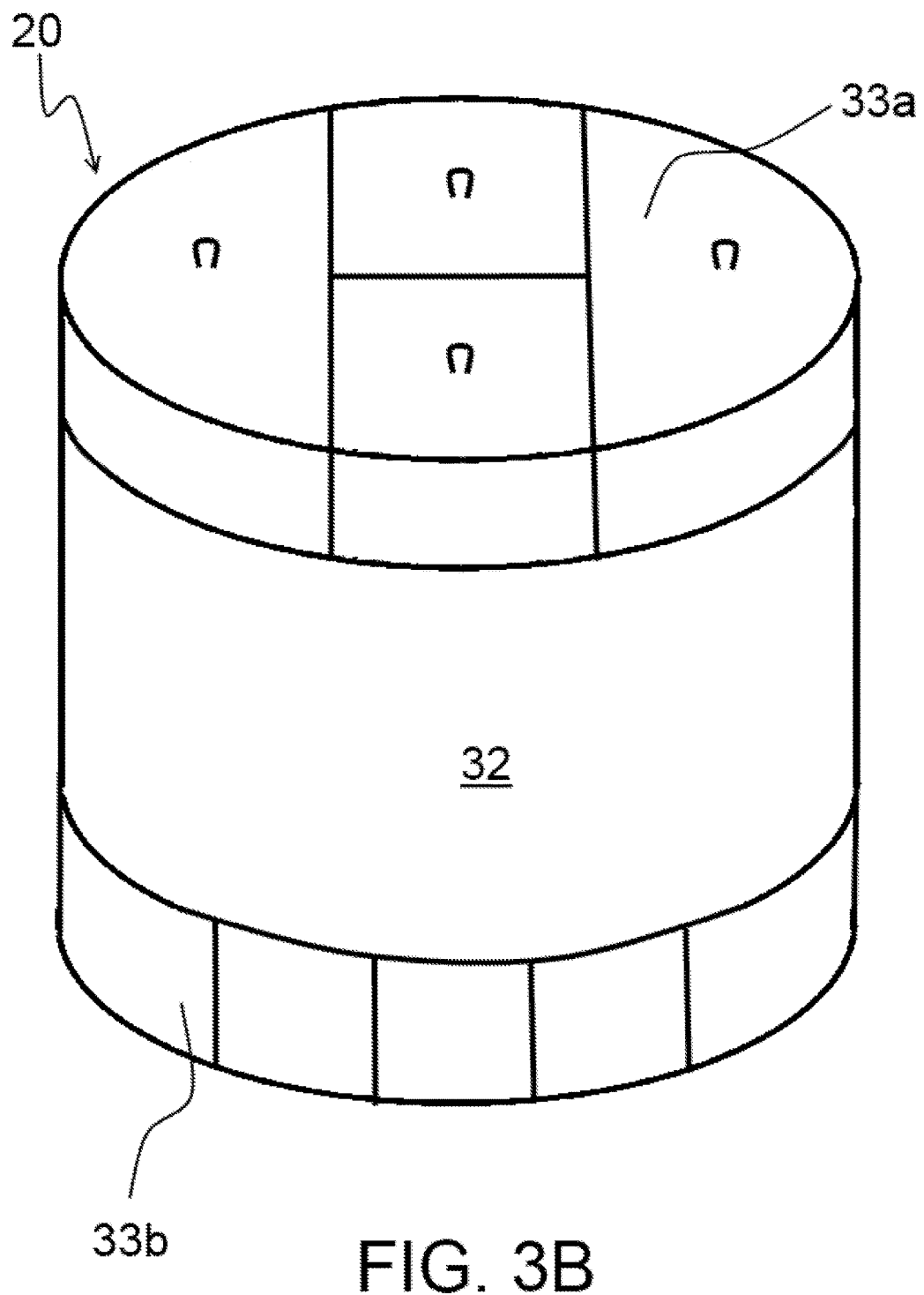
FIG. 3B is a perspective view of an LHTES system featuring an insulating top and bottom.

The LHTES system 20 is a modular system in which a multitude of modules 30 are aggregated into a single storage cluster. As depicted in the simplified schematic in FIG. 3A, the cluster of modules 30 is enveloped, encased or otherwise housed within thermally insulating material 32 formed as a layer or sleeve around the perimeter of the modules. As can be seen in FIG. 3B, the top 33a and bottom 33b of the cluster also feature insulating material 32. The top 33a and bottom 33b are removable or open to provide access to the modules 30. In some embodiments the top 33a is divided into separate pieces that can be lifted off of the cluster or that can be hydraulically actuated. Other embodiments of a removable top 33a to facilitate access to the modules 30 are easily envisioned. Further, in some embodiments, the bottom 33b features access panels for ease in uncoupling the modules. A variety of means can be used to provide access through the bottom 33b to the modules 30, such as removable panels, hinged doors, and sliding panels to name a few.

Figure 4:
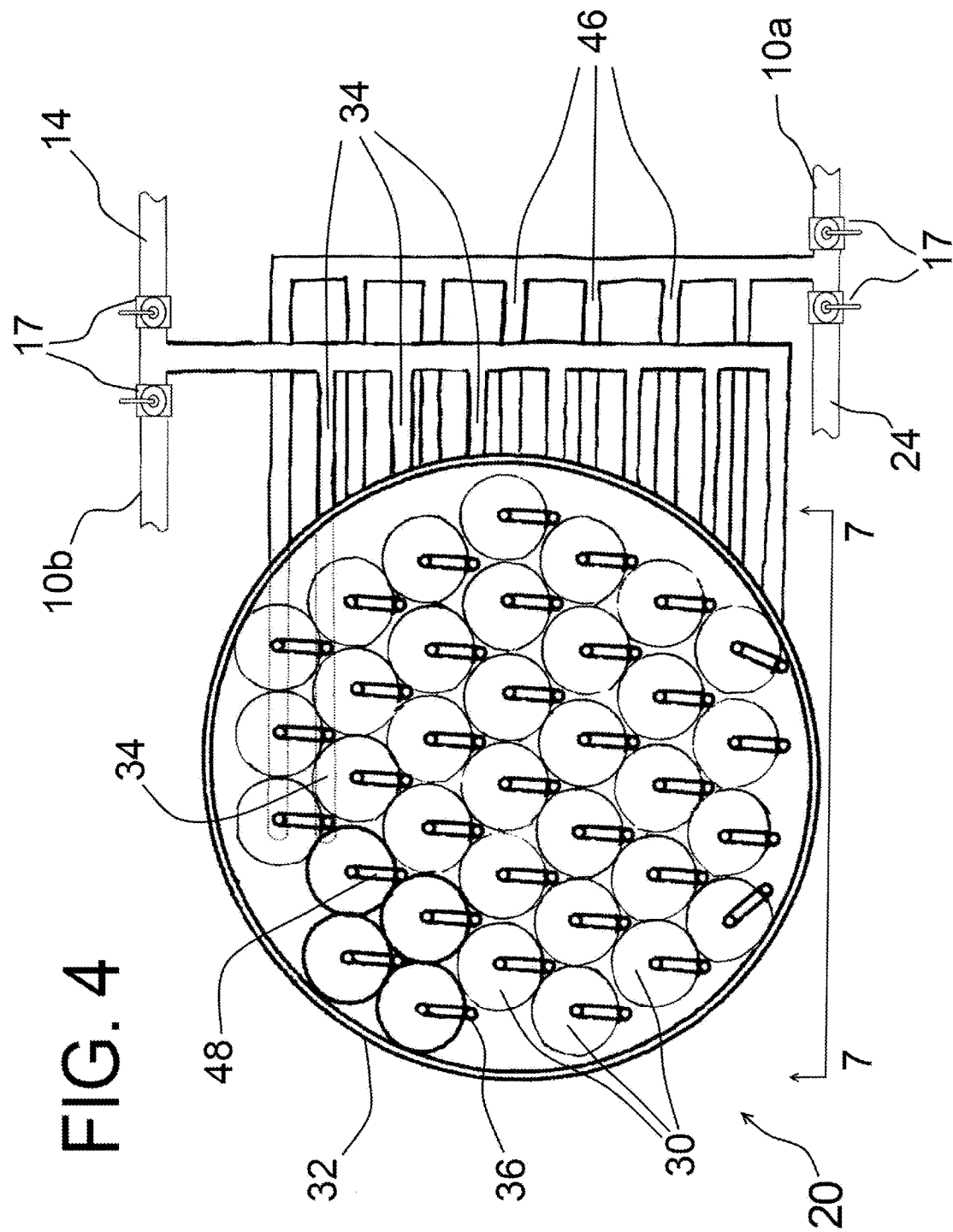
FIG. 4 is a plan view of the LHTES system.

The modules 30 are closely packed within the insulating material 32. Close packing minimizes the amount of area necessary to store the modules 30, which thereby maximizes energy density, i.e., the amount of energy stored in a given space. Close packing also minimizes energy loss to the environment, decreases the amount of insulating material 32 needed at the outer boundary and on the top 33a and bottom 33b, and reduces convective heat loss among the modules. For illustrative purposes, thirty-five modules 30 are depicted in FIGS. 3A and 4, but an actual LHTES system 20 could accommodate hundreds or thousands of modules 30.

The modular arrangement of the LHTES system 20 provides the aforementioned "containerless" aspect. Prior art systems utilized large tanks to house the thermal energy storage medium. The size of these prior art tanks could not change in response to the fluctuating storage needs of the system. Since the ultimate amount of storage for the present system 20 is divided among individual modules 30, the modules 30 can be added or removed as needed, and the insulating material 32 is expanded or contracted as necessary. Further, the insulating material 32 does not hold any liquid components but instead only insulates the cluster of modules 30. Thus, construction of large containers to hold the storage medium is unnecessary, and the system is said to be "containerless."

In order to enhance the exergy efficiency of the LHTES system 20, the modules 30 are well insulated with the insulating material 32. Suitable insulation materials are those with thermal conductivities less than 0.5 W/mK, and preferably less than 0.15 W/mK, at operational temperatures. Examples of suitable insulating materials 32 include Superwool®, Maftec™, Kaowool®, and any other materials that are able to withstand temperatures over 800° C. Typically, these materials will be used as liners on a rigid support substrate. Vacuum insulation at the perimeter of the cluster is also envisioned. The vacuum can be drawn between metal plates which can withstand the high temperatures of LHTES systems for advanced CSP plants above 800 C. The amount of insulating material 32 necessary for a given LHTES system will vary depending on output of the power plant, the number of modules 30, and the height and width of the modules 30. In one embodiment, a 100-MW CSP plant with 4290 modules, each having a height of 10 m and a diameter of 0.54 m, created a cluster with a diameter of 34.6 m. The insulating material 32 must cover the surface and top and bottom of the cylindrical cluster for proper insulation.

A salient feature of the insulating sleeve or layer is that it can be opened at one or both ends to afford easy accessibility to the modules. This results in the modules not being individually insulated. This also affords easy replacement of the modules when necessary. This further results in the possibility of a single HTF transfer manifold emanating from the egress ends of all of the modules.

FIG. 4 is a plan view of an LHTES system 20 showing the cluster without insulating material 32 on the top 33a but with a sleeve of insulating material surrounding the cluster of modules 30. During the charging cycle, the HTF is supplied to the LHTES system 20 by the second portion 10b of the inlet line 10. The second portion 10b of the inlet line 10 is in fluid communication with a number of inlet headers 34, which, in turn, supply the HTF to a number of modules 30 via conduits 36.

The HTF has a high specific heat capacity. In that way, the fluid absorbs more thermal energy per change in degree temperature than a fluid with a lower heat capacity. Preferably, the HTF has a relatively high heat transfer coefficient and low pumping power requirements. An embodiment of the invention utilizes a lithium fluoride-sodium fluoride-potassium fluoride as an HTF. This molten salt is composed of about 45-47 percent lithium fluoride, about 10-13 percent sodium fluoride, and about 40-45 percent potassium fluoride. An example of this HTF comprises 46.5 mol % lithium fluoride, about 11.5 mol % sodium fluoride, and 42 mol % potassium fluoride. This mixture is an example of a ternary eutectic alkaline metal halide salt mixture, commonly referred to as "FLiNaK." FLiNaK is molten above 454° C., has a specific heat capacity of 1882.8 J/kgK, and has a Prandtl number of 5.938.

Other suitable HTFs include: a mixture of 58% potassium fluoride and 42% zirconium fluoride, a mixture of lithium chloride and potassium chloride, and a mixture of lithium fluoride and beryllium fluoride (commonly referred to as FLiBe). A multitude of other molten salts or other fluids could be utilized. The requirements of each individual system will dictate to a large extent the selection of the HTF.

Figure 5:
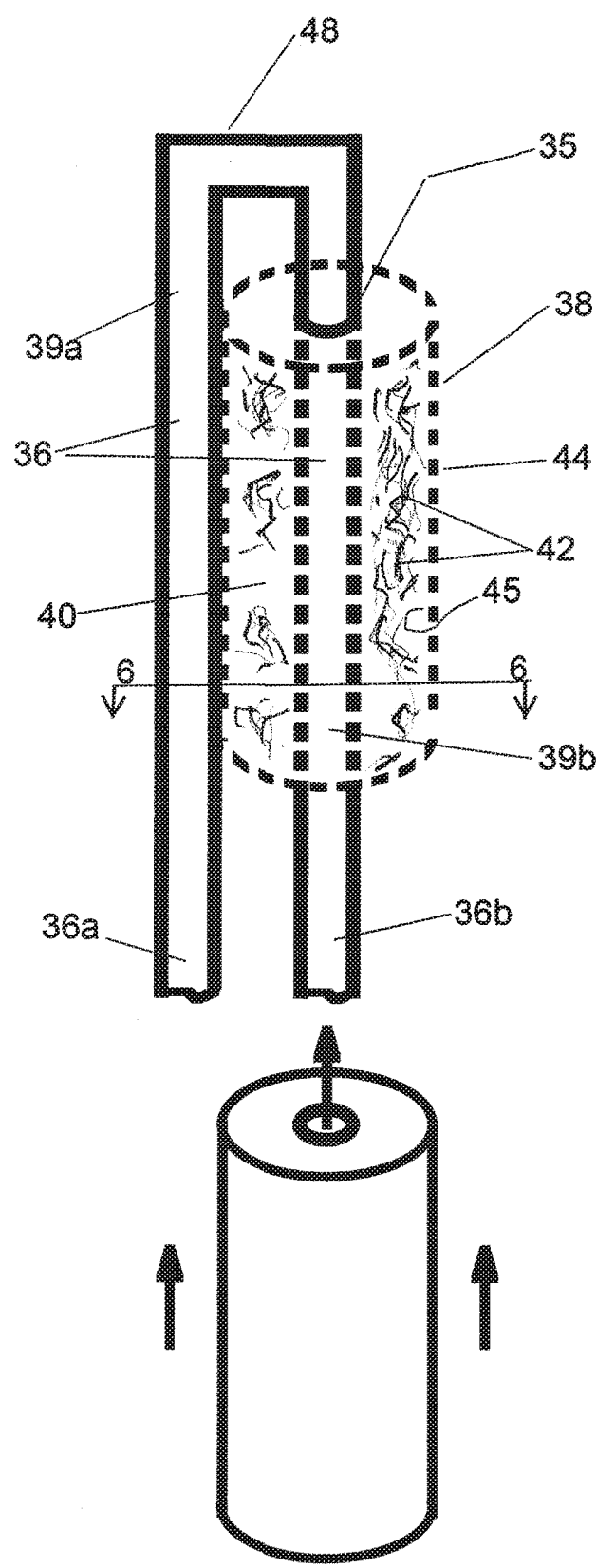
FIG. 5 depicts a latent heat thermal energy storage module in accordance with the features of the present invention.

An embodiment of a module 30 is depicted in FIG. 5. Each module 30 is comprised of a conduit 36 a portion of which extends substantially external from a jacket 38 defining an interior void of the module. The conduit 36, shown as generally "U" shaped, has a first leg 39a of the U terminating in a first end 36a and a second leg 39b of the U terminating in the second end 36b. The first leg 39a is that portion which extends external from the jacket, while the second leg 39b extends within the void defined by the jacket and generally parallel to the longitudinal axis of the void. The U bend allows both connections to the modules to be at one end of the module. This is not a requirement of the invention, but it facilitates assembly and removal of modules through the top using a hoist or a crane. Alternatively, one header could be at the bottom and the other at the top of the modules.

The first end 36a is in fluid communication with an inlet header 34, so as to facilitate ingress of the HTF to the module via the first end 36a. Disposed between the first end 36a and the second end 36b of the pipe 36 is the jacket 38. The void defined by interior surfaces of the jacket is adapted to receive and retain a heat retention medium 40 thereof. The heat retention medium 40 may be a solid at a first temperature and a fluid at a second higher temperature.

The HTF flows within in the pipe 36 from the first end 36a through an upstream end 35 of the jacket and through jacketed region 38, and towards the second end 36b of the conduit 36. The jacket 38 is sealed around the conduit 36 at the top and bottom of the jacket 38. A suitable manner of forming the seal is through a high temperature braze or weld. In some embodiments, the conduits 36 carry a high temperature and potentially corrosive HTF. As such, material selection for the conduits must be such that their melting points are higher than the HTF. For example, the inventors found Inconel 617 to be a suitable material for the conduits 36 when FLiNaK is utilized as an HTF. Inconel 617 is nickel alloy primarily containing additions of chromium, molybdenum, and iron, and it maintains its strength and corrosion resistance at high temperatures and pressures. Selecting a suitable conduit 36 requires consideration of the HTF to be used. A specific HTF will be selected for specific operational temperatures, and the HTF will have its own corrosive properties, possibly requiring the selection of a conduit 36 suited for that environment. In an LHTES system using FLiNaK, other suitable materials for the pipes 36 include Hastelloy X, Hastelloy N, and Ni-Resist 210 cast iron.

The jacketed region 38 contains the latent heat storage medium 40, which may include a thermal diffusion substrate 42, so as to be confined within the void defined by internal surfaces of the jacket 38. As the HTF flows through the jacketed region 38, the latent heat storage medium 40 absorbs the thermal energy of the HTF. The latent heat storage medium 40 latently stores the thermal energy by undergoing a phase transformation from solid to liquid upon being heated by the HTF. During the phase change, the thermal energy transferred from the HTF to the latent heat storage medium 40 is used to overcome the latent heat of fusion. However, some sensible heating will take place within the medium 40, and a temperature gradient across the medium 40 will develop. This temperature gradient is necessary to continuously transfer the heat from the HTF to the distal portion of the storage medium 40 so as to fully melt the solid phase into the liquid phase. In the melting process, the temperature of the storage medium at the HTF conduit 36 is higher than the melting temperature of the storage medium 40, which is the temperature at the solid-liquid interface during charging. During discharging, the opposite occurs, and a temperature gradient develops between the outer periphery of the medium 40 and the HTF conduit 36. Near the conduit 36, where the HTF is cooler, the medium 40 will cool to below its melting temperature.

Figure 6A:
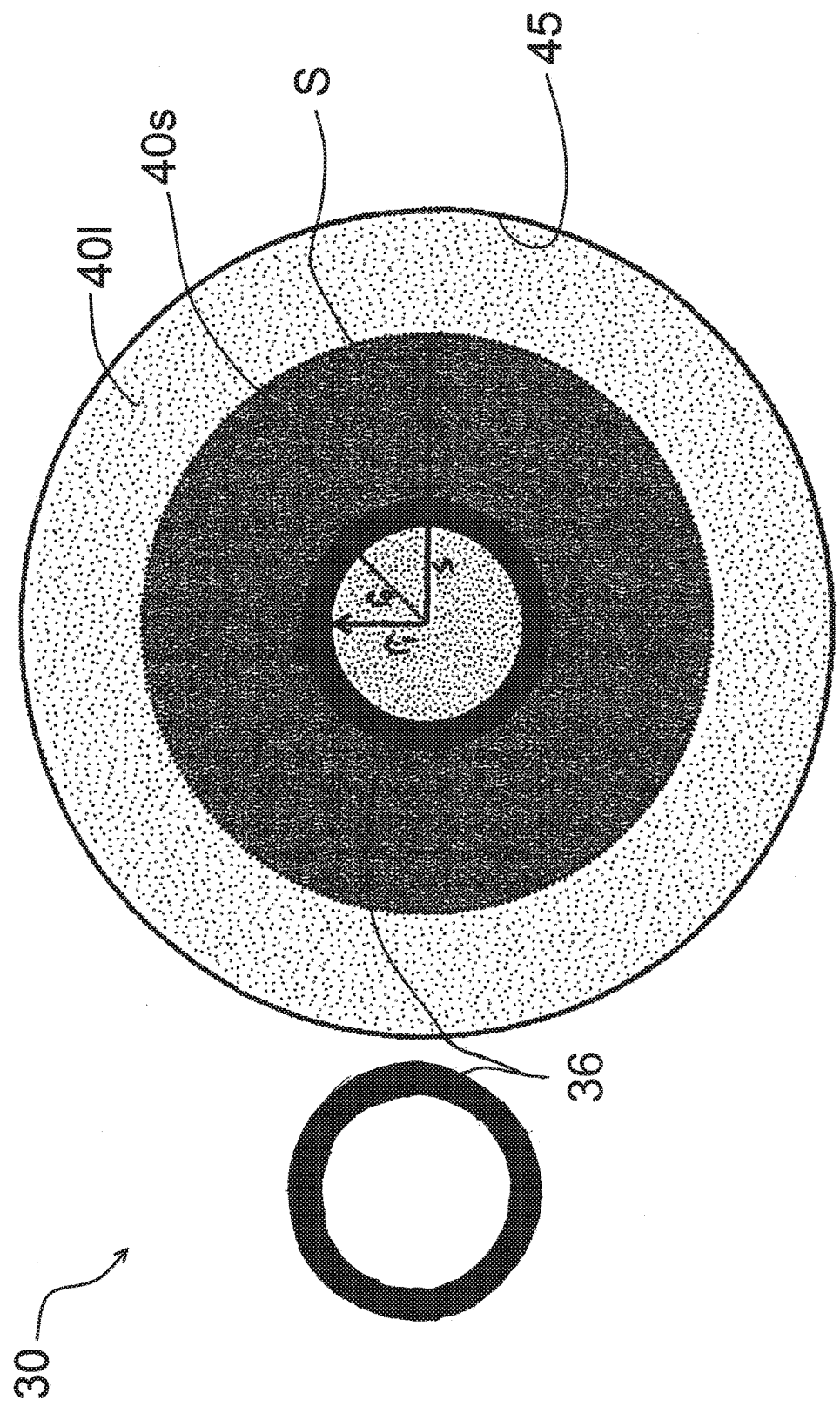
FIG. 6A is a sectional view taken along line 6-6 as shown in FIG. 5.
Figure 6B:
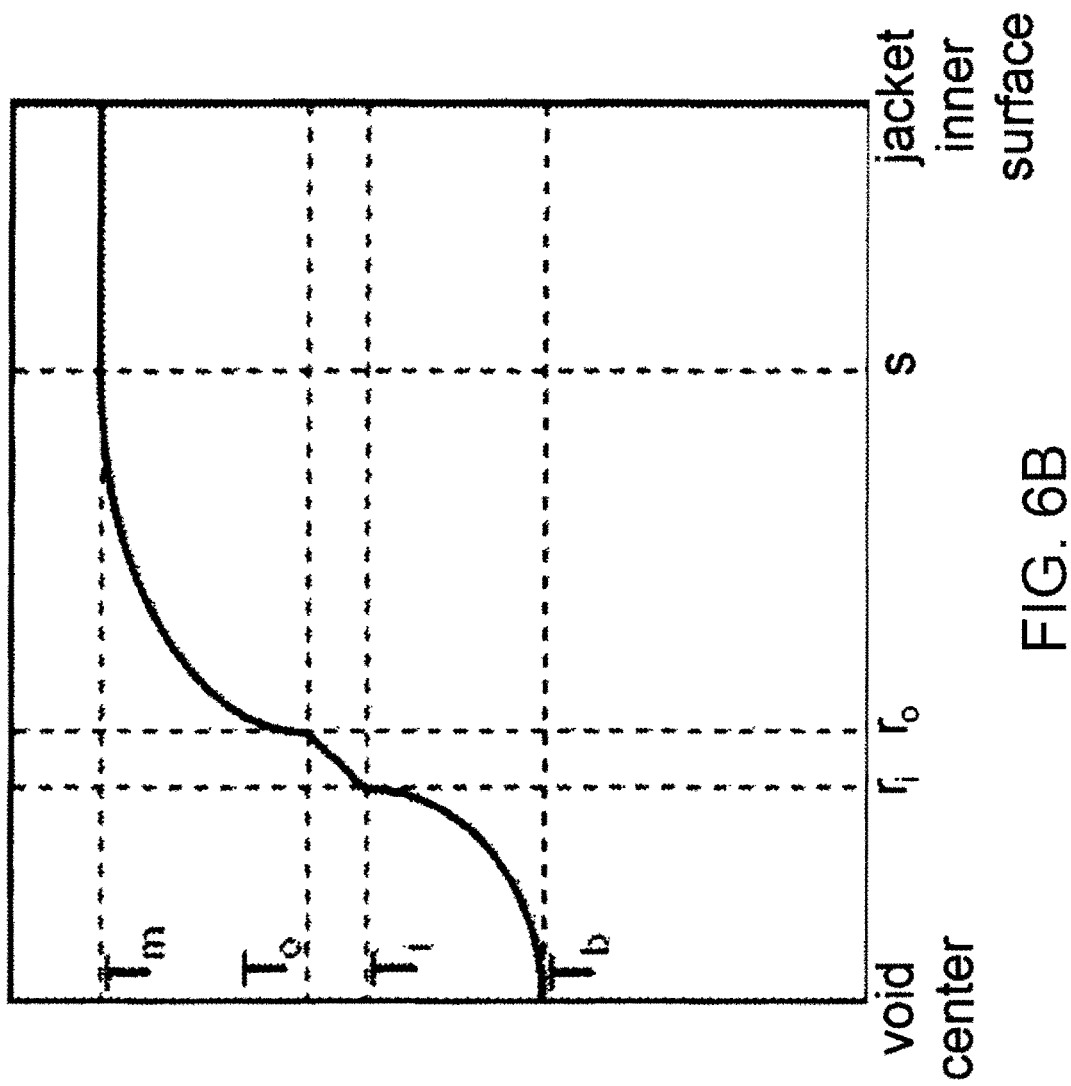
FIG. 6B is a graph of temperature relative to position within a module during the discharging cycle.

As can be seen in FIG. 6A, a liquid-solid interface s forms between the liquid phase 40l and the solid phase 40s. FIG. 6B depicts a thermal graph, wherein the ordinate is the temperature scale and the abscissa is the distance from the center of the conduit 36. $T_m$ corresponds to the melting point of the medium 40, $T_o$ corresponds to the temperature at the outside of the pipe 36, $T_i$ corresponds to the temperature at the inside of the pipe 36, and $T_b$ corresponds to the temperature in the bulk of the HTF. further, $r_o$ is the outside diameter of the pipe 36 and $r_i$ is the inside diameter of the pipe 36. FIG. 6A depicts the temperature gradient in the module 30 during the energy discharging cycle when the temperature of the medium decreases relative to the distance of the medium from the boundary 45 or interior surface of the jacket 38. As such, the medium 40 is cooler at or near the center of the void defined by the jacket compared to regions of the medium contacting or in close spatial relation to the interior surface of the jacket.

Preferably, in designing the modules 30, the jacketed region 38 is configured such that the liquid-solid interface s reaches the interior surfaces 45 of the jacketed region 38 substantially at the end of the charging cycle. If the liquid-solid interface s reached the boundary 45 during charging, then the LHTES system is less efficient because excessive sensible heating would take place. If the liquid-solid interface s never reaches the boundary 45 during charging, then the modules are too large, and significant savings in space and construction costs would be lost.

The size of the jacketed region 38 is dependent on the HTF conduit diameter and the HTF flow rate. A large conduit with a high flow rate transfers more thermal energy, requiring a larger jacket size. A small conduit with a low flow rate, therefore, requires a smaller jacket size. A discussion of optimal conduit size and flow rate is contained infra. Generally, HTF conduit flow rate that is in the low Reynolds number turbulent range of ~3000 is preferred. After selection of the HTF conduit size and flow rate, the diameter of the jacketed region is then calculated from transient analysis of the charging and discharging cycles. The transient analysis involves the calculation of the movement of the liquid-solid interface as a function of time from the beginning to the end of the charging and discharging cycles. The temperatures in the PCM/foam will deviate above or below the melting temperature at all locations over the course of the charging cycle and discharging cycles.

Figure 7:
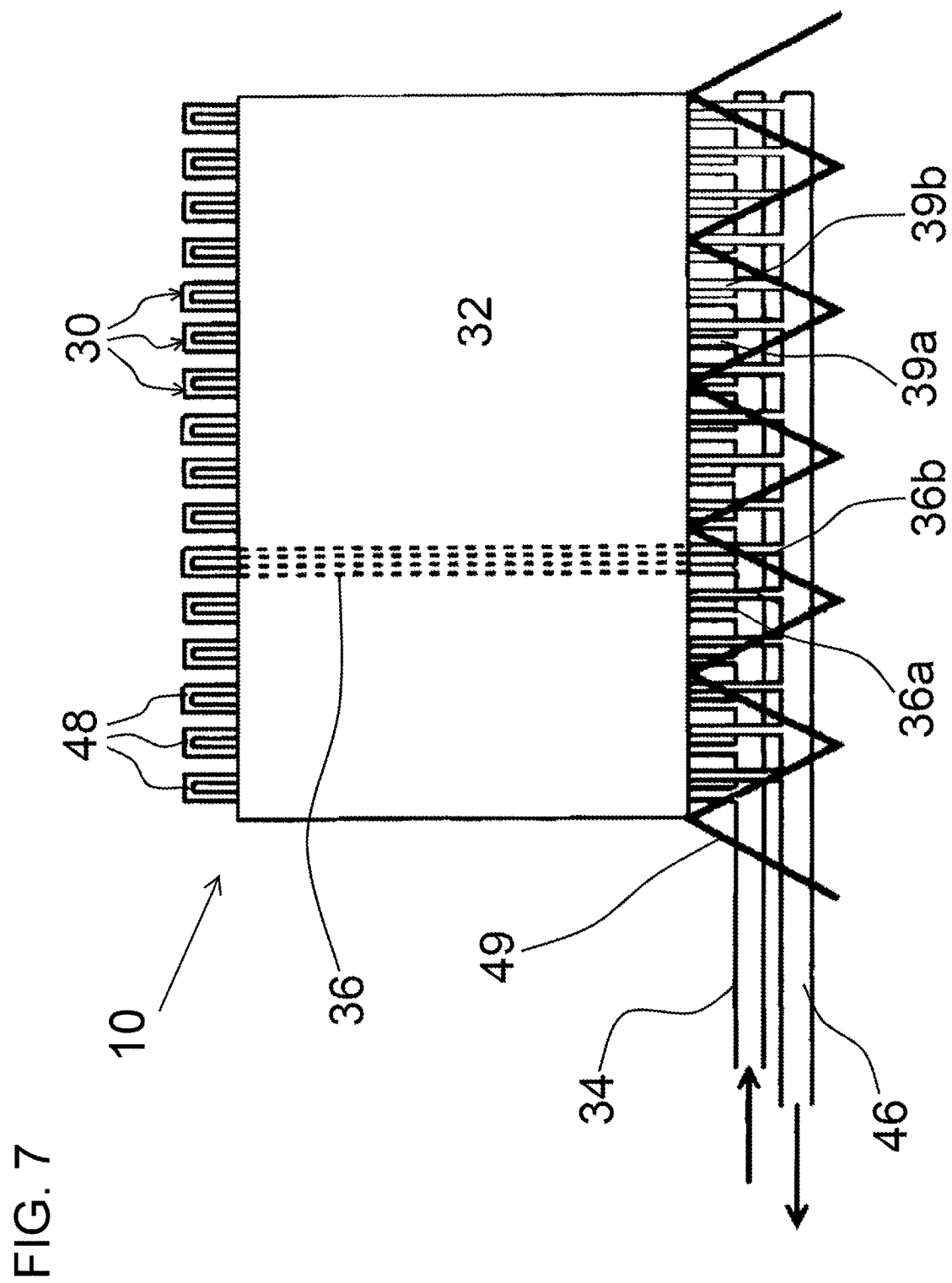
FIG. 7 is a side view of the LHTES system taken along line 7-7 as shown in FIG. 4.

After flowing through void defined by the jacketed region 38, the HTF continues toward the second end 36b of the conduit 36. The second end 36b of the conduit 36 is in fluid communication with an outlet header 46, as depicted in FIG. 7. The outlet header 46 is in fluid communication with the outlet line 13, which recirculates the HTF to the pipelines 9 and the solar energy collectors 7. This charging cycle is repeated multiple times throughout the sunny portion of a day.

As depicted in FIG. 5, the pipe 36 has a U-shaped design in which the first end 36a and second end 36b of the pipe 36 are separated by a bend 48. This feature allows for individual modules 30 to be independently inserted and removed from the cluster within the insulating material 32. As can be seen in FIG. 7 by placing both the first end 36a and the second end 36b of the pipe 36 on the same end of the module 30, the modules 30 can easily be uncoupled from the inlet header 34 and outlet header 46 and lifted free from the module cluster in the insulation 32. In this way, damaged modules can be replaced quickly and easily without disturbing the function of the other modules. The first end 36a and the second end 36b can be joined to the inlet header 34 and outlet header 46 in any suitable way, including but not limited to a pipe union, flare fitting, flange fitting, grooved pipe fittings, and mechanical joints. Since both the inlet header 34 and outlet header 46 reside outside of the insulating material 32, and in this case on along the same exterior side of the container, a support structure 49 is optionally provided access to the first end 36a and second end 36b of the module 30.

Other embodiments are easily envisioned. For instance, the inlet header 34 could be on the opposite end of the module 30 from the outlet header 46. Further, the first end 36a and the second end 36b of the pipe 36 could be located together at a first end of the module 30 such that the headers 34 and 46 are positioned superior from the modules 30 and such that a module 30 can be removed from below the insulating material 32. Also, while it has been stated that the first end 36a of the conduit 36 is in fluid communication with the inlet header 34 and the second end 36b of the conduit 36 is in fluid communication with the outlet header 36, a person of ordinary skill in the art will recognize that the first end 36a could instead be in fluid communication with the outlet header 46 and the second end 36b could be in fluid communication with the inlet header 34. In this way, the HTF flows through the second leg 39b of the conduit 36 first.

During the discharging cycle, flow along the primary loop, containing the solar collectors 7 is ceased, and flow along the feed line 14 is engaged. Referring to FIG. 4, a number of valves 17 are actuated to switch between fluid flow loops. On the inlet header 34 portion, the valve or valves 17 on the inlet line 10 are shut, while the valve or valves 17 on the feed line 14 are opened. On the outlet header 46, the valve or valves 17 on the outlet line 13 are shut. Thus, during the discharging cycle, the HTF flows between the heat exchanger 11 and the LHTES system 20.

When flowing back to LHTES system 10, the spent HTF is at a temperature lower than the latent heat storage medium 40. The difference in temperature causes the HTF to absorb thermal energy from the heat storage medium 40. Since the medium 40 was liquefied during the charging cycle, the outflow of heat will cause the medium 40 to freeze, or solidify.

The discharging cycle will repeat during the nonoptimal times and will cease when the sunlight can be effectively captured again. In an embodiment of the system, over the course of charging and discharging, the temperature of the latent heat storage medium 40 will not deviate more than about 100° C. from its melting temperature, and generally 100° C. or less.

Module Detail

As stated above, the module 30 generally comprises a HTF 36 and the jacket 38 or housing encapsulating a latent heat storage media. Optionally, a thermal diffusion substrate 42 is homogeneously intermingled with the medium 40. In a preferred embodiment, the latent heat storage medium 40 is a PCM with a melting temperature within the range of the plant's operational temperature. Typical operational temperatures are in the range of about 300° C. to about 1000° C. and preferably above about 700° C.

In general, liquid salts have been found to be suitable PCMs at these temperature ranges. An optimum LHTES system should have minimum and maximum operational temperatures that are within about 200° C. of each other. A liquid salt with a melting temperature somewhere near the middle of that range could be selected as the PCM. This helps to minimize temperature differences between the liquid salt's actual temperature and its melting temperature, i.e., minimize any potential sensible heating. Accordingly, the liquid salt must be selected based on the operational capabilities of a specific plant. Plants with a lower operational temperature range will require a salt with a lower melting temperature, while plants with a higher operational temperature range will require a liquid salt with a higher melting temperature. Liquid salt melting temperatures are commonly available to those of ordinary skill in the art. Specifically, at operational temperatures within the range of 620° C. to 820° C., magnesium chloride (MgCl$_2$) has been found to be a suitable PCM. Magnesium chloride has a melting point of 714° C. and a latent heat of fusion of 356 kJ/kg. For PCMs having the appropriate phase-change temperature, it is preferable to select the PCM with the highest heat of fusion.

Thermal Diffusion Substrate Detail

Many liquid salts have a low thermal conductivity. For example, magnesium chloride has a thermal conductivity of approximately 0.5 W/mK. When such salts are utilized, means could be utilized to increase heat transfer throughout the medium 40. Thus, the aforementioned thermal diffusion substrate 42 provides a means of distributing the thermal energy from the HTF. A variety of thermal diffusion substrates 42 can be utilized, including fins or heat pipes projecting radially from outside surfaces of the fluid conduit 36, homogeneous dispersions of particles throughout the medium 40, and porous foams. Aligned ligament graphite foam is a suitable thermal diffusion substrate 42 given of its high thermal conductivity and resistance to corrosion from the medium 40. The thermal diffusion substrate 42 can be formed outside the jacket 38 and then inserted into the jacket 38, or the thermal diffusion substrate 42 can be formed inside the jacket 38. Further, thermal diffusion substrate 42 can be infiltrated by the PCM inside or outside the jacket 38.

Thermal diffusion substrates 42 having thermal conductivities an order of magnitude higher than the PCM are suitable for offsetting the relatively low thermal conductivities of some heat storage media 40. Further, a range of thermal conductivities can be obtained depending on the porosity of the foam comprising a single thermal diffusion substrate 42. For example, the effective thermal conductivity for combinations of magnesium chloride and aligned ligament graphite foam with 95%, 90%, 70%, and 60% porosity are 10 W/mK, 30 W/mK, 85 W/mK, and 170 W/mK, respectively. The effective thermal conductivity increases with increasing amount of aligned ligament graphite. However, a lower porosity corresponds to a smaller volume of PCM per module.

The latent heat storage medium 40 and heat diffusion substrate 42 are contained in the containment vessel 44 defined by the jacket 38. The containment vessel 44 is a tube of a larger diameter than that of the conduit 36. The containment vessel 44 can be made of a thin walled material because of minimal strength requirements, and insulation of individual modules 30 is not required in the invented LHTES system.

As the HTF flows from the first end 36a of the conduit 36 to the second end 36b, its thermal energy will continually be absorbed by the medium 40. An embodiment of the fluid conduit 36 is continuous in that it is comprised of a single substrate. The temperature of the HTF will drop over the length of the conduit 36. The temperature of the HTF must be above the melting temperature of the medium 40 along the entire length of the conduit 36b encapsulated by the jacket. This is to ensure a complete phase transformation. In some instances, a high temperature difference may exist between the HTF and the PCM at the HTF inlet to the module, which would decrease the energy efficiency of the system. Therefore, in some embodiments of the presently invented LHTES system 20, the jacketed region 38 of the module 30 contains a "cascade" of media 40. Cascading media 40 means that multiple PCMs are used along the length of the pipe such that the temperature difference between the HTF and the PCM is minimized along the length of the module. Aside from the axially extended cascade paradigm, radially extended cascade paradigms are also envisioned such that lower melting media are arranged on the periphery of higher melting ones such that the media are arranged concentrically.

In cascaded system, PCMs are divided into two separate jacketed regions to prevent the mixing of the PCMs when melted. However, no special interface is required between the two jacketed sections because heat transfer within the jackets operates in the radial, not axial, direction. The jacketed regions 38 are typically preformed and can simply be slid over the conduit in succession with the highest melting temperature PCM nearest to the first end 36a and the lowest melting temperature PCM nearest to the second end 36b. The jacketed regions 38 are then sealed in place by a high temperature braze or weld.

In an embodiment of the cascaded system, potassium chloride (KCl) is used in conjunction with magnesium chloride. Potassium chloride has a melting temperature of 770° C. and a latent heat of fusion of 359 kJ/kg. Accordingly, potassium chloride is positioned proximal to the first end 36a of the pipe 36 where the HTF is the hottest. As the temperature of the pipe 36 transitions below 770° C. the further from the upstream end 35 of the jacket 38, relatively lower melting media downstream of the relatively higher melting media experiences a phase change. In another embodiment, the sodium chloride is used in conjunction with magnesium chloride. Sodium chloride has a melting temperature of 801° C. and a latent heat of fusion of 488 kJ/kg.

Though only two media 40 were described in these cascaded embodiments, theoretically a module could have several more tailored PCM regions. The ability to cascade PCMs within modules is an advantage over prior art thermal energy storage systems because of the impracticability of cascading PCMs over the large diameter of prior art storage tanks.

LHTES System Design Detail

One of the goals of the invented LHTES system is to reduce the construction and operation costs of CSP plants.

Costs for a CSP plant can be reduced by decreasing the size and number of storage tanks required to operate the plant during nonoptimal times. As discussed above, the invented LHTES system 20 provides a greatly reduced capital cost by eliminating costly storage tanks. However, the relationship between certain characteristics within the LHTES system 20 can further reduce the costs of operating the system.

One means of reducing the cost of an LHTES system is to reduce the overall size of the system. This can be accomplished by reducing the number of modules contained therein. Based on the inventor's models, the number of modules 30 required for a system is given by the following equation:

$$N = \frac{A_{total}}{\pi(s^2 - r_o^2)} \qquad (2)$$

where N is the number of modules, $A_{total}$ is the total required cross-sectional area of the PCM/foam combination in the medium 40 determined by the total energy storage, s is the distance from the center of the module that the solid-liquid interface has traveled, and $r_o$ is the outside diameter of the HTF pipe 36. $A_{total}$ is determined from the required plant heat storage to produce electricity during nonoptimal times and the height of the storage modules. An equation to approximate $A_{total}$ is $$A_{total} = \frac{\rho h L_f}{E} \qquad (3)$$

where $\rho$ is the density of the storage medium 40, h is the height of the module 30, $L_f$ is the latent heat of fusion of the PCM, and E is the thermal energy storage of the system. The distance s that the solid-liquid interface travels depends on the diameter of the module 30.

Figure 8:
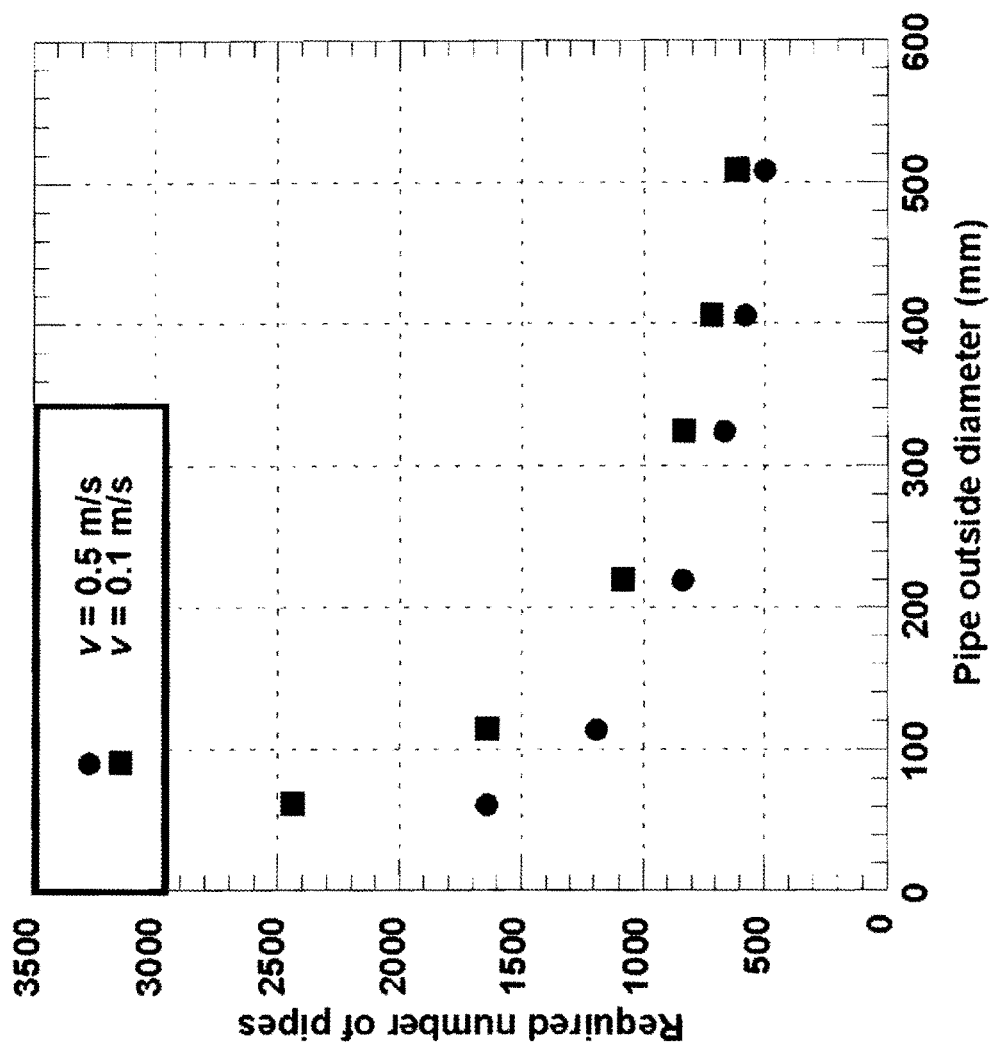
FIG. 8 is a graph showing the relationship between the size of the pipe and the number of modules.

From Equation 2, it can be seen that the number of pipes required depends on the outside diameter of the pipe 36. As can be seen in FIG. 8, the number of conduits (referred to as "pipes" in FIGS. 8 and 9) required for the presently invented LHTES system is drastically reduced over the range of sizes considered. However, larger diameter pipes require increased pumping power. Thus, preferably, the cost savings in terms of the number of modules necessary for a system with larger diameter pipes is compared to the operational costs in terms of the pumping power required. In a preferred embodiment of the invention, an HTF conduit defining an outside diameter of two inches optimally balances capital installation costs and ongoing operational costs.

Figure 9:
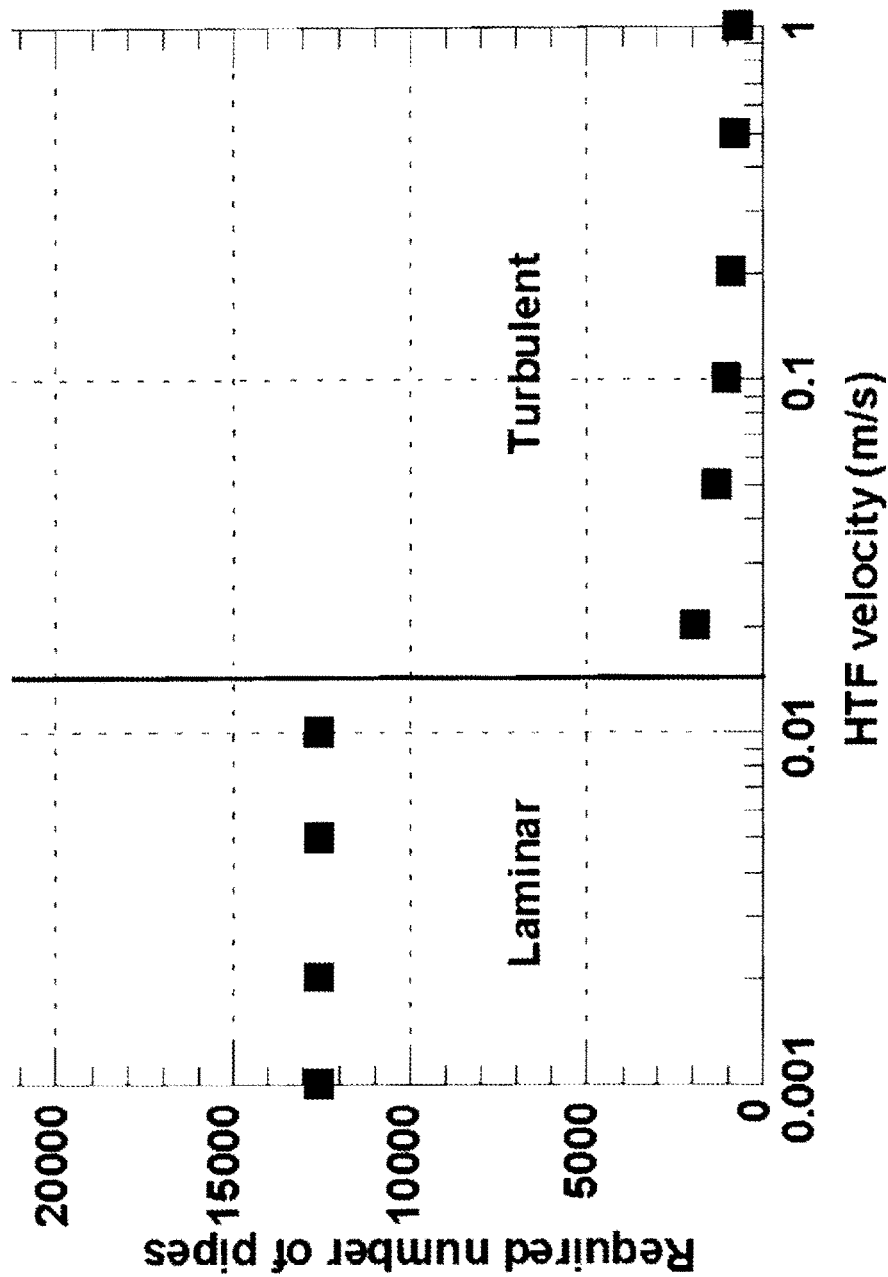
FIG. 9 is a graph showing the relationship between the type of HTF flow and the number of modules.

The flow rate of the HTF also has an effect on the total number of HTF conduits 36 required in the LHTES system. As can be seen in FIG. 9, once the HTF achieves turbulent flow, the total number of pipes greatly diminishes. Continuing to increase the flow rate will continue to reduce the number of pipes. However, the volumetric flow rate and, consequently, the power needed to pump the HTF increases. Preferably, the savings in capital expenditure is compared to the long term operational costs of HTF pumping power requirements. In that sense, the flow rate is a compromise between heat transfer efficiency (high flow rate) and pumping power cost (low flow rate). The inventors determined that the optimum flow rate, in terms of heat transfer efficiency and cost, is the rate just above that necessary to achieve turbulent flow conditions at a Reynolds number of approximately 3000.

Since the specifics of any CSP plant will depend on the power output requirements, three examples of LHTES storage systems are provided for illustration purposes only. However, in practical applications, the number of modules 30, size of the pipes 36, PCM material, HTF, and other features are tailored to the specifics of each CSP plant's power requirements and operational temperature.

EXAMPLE 1

In this example, a 50-MW CSP plant with an eight-hour charging cycle and a twelve-hour discharging cycle is illustrated. The latent heat storage medium was magnesium chloride containing aligned ligament graphite foam as the thermal diffusion substrate. The PCM/foam combination had a thermal conductivity of about 30 W/mK and a foam porosity of about 90 percent, i.e., about 90 percent PCM and about 10 percent foam by volume. In an embodiment of the invention, most of the thermal conductivity is provided by the foam inasmuch as thermal conductivity of PCM alone is under approximately 0.5 W/mK. The HTF conduits were fabricated from Inconel 617. The HTF was FLiNaK.

The size of the LHTES system varied according to an identified relationship between the HTF flow rate and the size of the HTF conduits. The inventors determined that a flow rate of 0.5 m/s and a NPS 8, SCH 10 HTF conduit (outside diameter of 219.08 mm; thickness of 3.759 mm) produced a system with the least capital installation costs. This system required 839 HTF conduits that were 10 m in height, which corresponds to a module cluster diameter of 33.4 m. The capital cost is the lowest because the fewest building materials are needed. However, in terms of ongoing operational costs, the inventors found that a heat transfer flow rate of 0.1 m/s and a HTF conduit of size NPS 2, SCH 120 (outside diameter of 60.32 mm; thickness of 6.65 mm) decreased the volumetric flow rate by a factor of 25.6, while only increasing the number of conduits by a factor of 2.9. Thus, the LHTES system described contained 2433 modules, which corresponds to a module cluster diameter of 32.9 m. Thus, despite having more modules, the actual size of the modules was decreased because of the smaller conduit diameter and the lower flow rate. This system has an optimized balance of capital installation and ongoing operational costs. The HTF conduit size and HTF flow rate in Examples 2 and 3 were chosen based on the observations made in this example.

EXAMPLE 2

In this example, a 100-MW CSP plant with an eight-hour charging cycle and a twelve-hour discharging cycle will be considered. This LHTES system requires 4290 modules. The modules were spaced 0.54 m from center to center, which required a module cluster diameter of 34.6 m. Magnesium chloride supported on 90% porous aligned ligament graphite was used as the latent heat storage medium. The HTF was FLiNaK. The HTF pipes were Inconel 617 of size NPS 2, SCH 120. During charging, the HTF was set to a flow rate of 0.15 m/s. During discharging, the HTF was set to a flow rate of 0.1 m/s.

The following are temperature measurements for various components of the system. The latent heat storage medium had an initial temperature of 620° C. During charging the HTF had an inlet temperature of 820° C. and an outlet temperature of 765° C. The HTF remained above the PCM melt temperature along substantially the entire module length, and the temperature difference between the HTF and the PCM was below approximately 100° C. throughout. During discharging, the HTF had an inlet temperature of 607° C. and an outlet temperature of 664° C.

The inventors performed an exergy efficiency investigation in this and the next example. The exergy efficiency is directly dependent on the HTF inlet and outlet temperatures. In turn, the inlet and outlet temperatures of the HTF are dependent on the PCM properties, the HTF conduit size, and the HTF flow rate. This LHTES system design produced an exergy efficiency of about 97 percent. In an embodiment of the system, 96.8 percent efficiency was realized. This level of exergy efficiency indicates that the energy storage process is highly reversible, i.e., the energy stored in the medium was able to be recovered without a great loss from increases in entropy. Thus, the vast amount of energy stored by the system during the daylight charging cycle is able to be recovered efficiently during discharging cycle at nonoptimal times.

EXAMPLE 3

In this example, the LHTES system featured the same specifications as that of Example 2 with the exception that the module 30 was cascaded. One method of fabricating a cascading module is to slide each preformed PCM/foam section over the HTF pipe in succession. The arrow in FIG. 3A shows the direction of the sliding module to its installed position (dashed lines) within a single module configuration. FIG. 5 shows the direction of the sliding module to its installed position within a multi-module configuration. The interface between two different PCM sections is not important because the heat transfer is in the radial, not axial, direction. The module was comprised of equal volumes of sodium chloride and magnesium chloride. The magnesium chloride was positioned downstream of the sodium chloride within the latent heat storage media 40. The sodium chloride section was in direct contact with the magnesium chloride section. The thermal diffusion substrate was aligned ligament graphite foam of 90% porosity. These changes resulted in slightly higher module outlet temperatures: 773° C. during charging and 665° C. during discharging.

The overall exergy efficiency of this system was calculated to be 97.8%. This example shows that cascading improves overall exergy efficiency.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The invention claimed is:

1. A device for latent heat storage, the device comprising:
a thermally insulating sleeve enveloping a plurality of heat storage modules, each heat storage module comprising:
a) a conduit to supply a heat transfer fluid, the conduit having a first end and a second end, wherein the conduit is adapted to receive a heat transfer fluid, wherein said heat transfer fluid flows from an upstream heat source into the first end and out of the second end to a downstream heat exchanger;
b) a jacket encircling a portion of the conduit between the first end and second end;
c) a phase change material positioned in the jacket; and
d) a porous thermal diffusion substrate intermingled with the phase change material, wherein heat transfer of between 300 degrees Celsius and 1000 degrees Celsius occurs within the jacket, wherein said conduit defines a first section proximal to the first end, a U-bend positioned external of the jacket, and a second section proximal to the second end, wherein the U-bend separates the first section from the second section such that the first section extends external from the jacket, wherein the second portion extends within a void created by the jacket, wherein the second portion is parallel to the longitudinal axis of the void; and wherein the first section extends along the outer surface of jacket so as to be in contact with the jacket.

2. The device of claim 1, wherein the phase change material is a chloride selected from the group consisting of potassium chloride, sodium chloride, magnesium chloride, and combinations thereof.

3. The device as recited in claim 1 wherein the substrate is aligned ligament graphite that is between 80 and 95 percent porous.

4. The device as recited in claim 1 wherein the first end and second end are positioned at the same end of the jacket.

5. The device of claim 1 wherein the heat transfer fluid is molten salt.

6. The device of claim 5 wherein the molten salt is mixture of lithium fluoride, sodium fluoride, and potassium fluoride.

7. The device as recited in claim 1 wherein the phase change material in the jacket defines a liquid-solid interface.

* * * * *